Patented Sept. 19, 1922.

1,429,522

UNITED STATES PATENT OFFICE.

ALWIN MITTASCH AND FRITZ WINKLER, OF LUDWIGSHAFEN-ON-THE-RHINE, GERMANY, ASSIGNORS TO BADISCHE ANILIN- & SODA-FABRIK, OF LUDWIGSHAFEN-ON-THE-RHINE, GERMANY, A CORPORATION OF GERMANY.

MAUFACTURE OF FINELY DIVIDED SULPHUR.

No Drawing. Application filed August 19, 1921. Serial No. 493,650.

*To all whom it may concern:*

Be it known that we, ALWIN MITTASCH and FRITZ WINKLER, citizens of Germany, residing at Ludwigshafen-on-the-Rhine, Germany, have invented new and useful Improvements in the Manufacture of Finely-Divided Sulphur, of which the following is a specification.

According to the present invention, sulphur can be advantageously obtained in a state of extremely fine division or in a highly dispersed or colloidal condition, by evaporating solutions of ammonium polysulfid containing a protective colloid, until the ammonia and hydrogen sulfid are practically removed. Protective colloids of various kinds may be employed, or mixtures of such bodies, or waste materials containing the same, as for example saponines, gelatine, casein, sodium lysalbinate, waste sulfite liquor, naphthol pitch, glycerine foots and the like. Evaporation may be effected under ordinary or diminished pressure, and by means of passing inert gases through the solutions, if desired, and the concentration of the solutions may vary within wide limits. A very finely divided, white sulphur capable of forming extremely stable suspensions, or sols, is obtained by this process. Moreover, the properties of the sulphur so obtained can further be influenced and graduated by the nature of the protective colloid employed and its quantity.

The sulphur can be separated from the liquid by adding an electrolyte, or by mechanical or other like means such as a current of air blown through the solution. In the case of concentrated solutions, a portion of the sulphur settles after a time as a white creamy deposit. From such separated masses or deposits the sulphur can be easily retransformed into a very stable sol by simply shaking or stirring with water.

The same effect as above described is also obtained if the ammonia and hydrogen sulfid are only incompletely removed by evaporation and in this case the remaining ammonia is neutralized by an acid and the hydrogen sulfid converted into sulphur by treating with oxidizing agents, as for example air or nitric acid, which so formed will then also be in a colloidal, or very finely divided, state.

The nature of this invention will be further illustrated by reference to the following examples to which, however, the invention is not limited.

*Example 1.*

Allow a concentrated solution of ammonium polysulfid to run slowly into a boiling aqueous solution of soap of 0.5 per cent strength, and contained in an aluminium, or aluminium fitted, or enamelled, vessel, to that the ammonia and hydrogen sulfid are continuously boiled away. A thick milk of sulphur is produced which is first yellowish-white but becomes pure white as soon as the ammonia and hydrogen sulfid are completely removed. If a test portion of this milky liquid be diluted with a large quantity of water (about 1000 or 10,000 times as much), a highly dispersed, bluish sol is obtained, the particles of which are of a size of 0.001 millimetres and even less.

*Example 2.*

Work according to Example 1 employing instead of the soap solution a 5 per cent solution of evaporated neutral waste sulfite lye (which may be oxidized with hypochlorite or the like). From the milk of sulphur so obtained, the sulphur separates on standing in the form of extremely small threads or needles, giving a deposit of a brownish color owing to the impurities of the sulfite liquor. This deposit can be filtered off, washed and brought into a paste or dried. It can be again transformed into a milk of sulphur or into a sol by simply shaking or stirring with water, without any further addition of protective colloids.

Owing to its extremely fine division, the sulphur obtained according to this invention can be employed for all kinds of pharmaceutical purposes as well as for curing plant and other diseases. For practical purposes it may often be advantageous to bring the sulphur into a paste or powder and to retransform them according to need into a suspension or colloidal solution, by the methods above described.

We claim:—

1. The process of manufacturing sulphur in a very finely divided state by evaporating an ammonium polysulfid solution containing a protective colloid.

2. A modification of the process set forth in the preceding claiming clause consisting in partly decomposing the ammonium polysulfid solution by evaporation and completing the decomposition by chemical action.

3. The process of manufacturing sulphur in a very finely divided state by evaporating an ammonium polysulfid solution, containing waste sulfite liquor.

4. The process of manufacturing sulphur in a very finely divided state by evaporating an ammonium polysulfid solution, containing waste sulfite liquor, and neutralizing a remaining part of ammonia by adding acid.

5. The process of manufacturing sulphur in a very finely divided state by decomposing by evaporation an ammonium sulfid solution containing a protective colloid, and separating the colloidal sulfur from the liquid.

6. As a new article of manufacture, sulphur in a very fine state of division and consisting of extremely fine crystalline needles.

In testimony whereof we have hereunto set our hands.

ALWIN MITTASCH.
FRITZ WINKLER.